United States Patent
El-Haj-mahmoud et al.

(10) Patent No.: US 7,584,347 B2
(45) Date of Patent: Sep. 1, 2009

(54) SYSTEM AND METHOD FOR IDENTIFYING BOOTABLE DEVICE BY GENERATING A SIGNATURE FOR EACH BOOTABLE DEVICE WHERE THE SIGNATURE IS INDEPENDENT OF A LOCATION OF THE BOOTABLE DEVICE

(75) Inventors: Samer El-Haj-mahmoud, Austin, TX (US); Alan Brumley, Cedar Park, TX (US); Wei Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 386 days.

(21) Appl. No.: 11/150,750

(22) Filed: Jun. 10, 2005

(65) Prior Publication Data

US 2006/0282652 A1 Dec. 14, 2006

(51) Int. Cl.
G06F 9/24 (2006.01)
G06F 1/24 (2006.01)
G06F 13/00 (2006.01)

(52) U.S. Cl. .............................. 713/1; 713/100; 710/704
(58) Field of Classification Search .................... 713/1, 713/2, 100; 710/104, 310; 326/108
See application file for complete search history.

(56) References Cited

U.S. PATENT DOCUMENTS

| | | | |
|---|---|---|---|
| 5,822,582 A | 10/1998 | Doragh et al. | |
| 5,854,905 A * | 12/1998 | Garney | 710/104 |
| 6,044,423 A * | 3/2000 | Seo et al. | 710/302 |
| 6,167,472 A * | 12/2000 | Mitra et al. | 710/65 |
| 6,225,829 B1 * | 5/2001 | Acharya | 326/108 |
| 6,721,883 B1 * | 4/2004 | Khatri et al. | 713/2 |
| 6,834,799 B2 * | 12/2004 | Tanabiki et al. | 235/382 |
| 6,839,724 B2 * | 1/2005 | Manchanda et al. | 707/203 |
| 6,990,685 B1 * | 1/2006 | Christensen et al. | 726/34 |
| 7,287,257 B2 * | 10/2007 | Meza | 719/321 |
| 2005/0198485 A1 * | 9/2005 | Nguyen et al. | 713/1 |
| 2006/0179294 A1 * | 8/2006 | Chu et al. | 713/2 |

* cited by examiner

Primary Examiner—Suresh K Suryawanshi
(74) Attorney, Agent, or Firm—Baker Botts L.L.P.

(57) ABSTRACT

A system and method is disclosed for identifying at least one bootable USB device coupled to a computer system across multiple reboots of the computer system. A four-byte signature for each bootable USB device is generated by performing a hash function on a Device Identification Number, a Vendor Identification Number, and at least a subset of a Serial Number, all of which are associated with that bootable USB device. The four-byte signature for each bootable USB device is saved in a BIOS boot order table located in a non-volatile storage unit in the computer system.

20 Claims, 3 Drawing Sheets

SYSTEM AND METHOD FOR IDENTIFYING BOOTABLE DEVICE BY GENERATING A SIGNATURE FOR EACH BOOTABLE DEVICE WHERE THE SIGNATURE IS INDEPENDENT OF A LOCATION OF THE BOOTABLE DEVICE

TECHNICAL FIELD

The present disclosure relates generally to computer systems and information handling systems, and, more specifically, to a system and method for identifying bootable Universal Serial Bus devices coupled to a computer system across reboots of that computer system.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

When booting a computer system in an information handling system, a user typically has several bootable devices, from which he or she may choose to boot the computer system. Certain bootable devices, such as floppy disk drives or compact-disk read-only-memory ("CD-ROM") drives, can emulate or receive controls from the basic input-output system, or ("BIOS"). Other example bootable devices, such as devices that rely on the peripheral component interconnect bus, or "PCI devices," supply their own boot code. When booting, a customer may bring up a list of possible bootable devices and assign a rank to each bootable device to form a "boot order" for the collection of bootable devices. The computer system will then follow the boot order when booting, attempting to boot from the first-ranked bootable device, and then, upon failure, attempting to boot from each successive bootable device in the boot order. The user will expect, and often require, that this boot order remain constant from one reboot to the next.

Maintaining a constant boot order for BIOS-emulated or -controlled devices is relatively easy because the BIOS remains constant from reboot to reboot. Likewise, PCI devices can be tracked using an identifier, the bus:device:function number, that is guaranteed to be unique for each PCI device by the PCI specification. Bootable devices are increasingly relying on the Universal Serial Bus standard, or "USB," however, and bootable USB devices are typically not uniquely identifiable by the computer system from reboot to reboot. Server systems, such as Dell's 9G PowerEdge Server systems, now support multiple bootable USB devices. These bootable USB devices could be of the same type, such as bootable USB mass-storage devices. The USB specification guarantees that, for any USB device that is associated with a Serial Number, a concatenation of the Device ID, Vendor ID, and the device's Serial Number will be unique. This concatenation contains too many bytes to fit into the existing BIOS signature fields of the predefined BIOS boot order table. Given the ease with which USB devices can be connected and disconnected in information handling systems, changes in the USB topology may happen quite frequently. Bootable USB devices may be "misplaced" in the information handling system, and as a result, the information handling system may not be able to follow the boot order set by the user in a previous reboot. Although bootable USB devices may be pinpointed by their location, the user must subject himself or herself to the tedious process of plugging, unplugging, and adding USB hubs as necessary to track a specific bootable USB device.

SUMMARY

In accordance with the present disclosure, a system and method is disclosed for identifying at least one bootable USB device coupled to a computer system across multiple reboots of the computer system. A four-byte signature for each bootable USB device is generated by performing a hash function on a Device Identification Number, a Vendor Identification Number, and at least a subset of a Serial Number, all of which are associated with that bootable USB device. The four-byte signature for each bootable USB device is saved in a BIOS boot order table located in a non-volatile storage unit in the computer system.

The system and method disclosed herein is technically advantageous because it provides a system and methodology for a user to reboot a computer system using a previously stored BIOS boot order table, even if multiple bootable USB devices have been rearranged or added to the computer system. Because the system and method disclosed herein do not require the computer system to track bootable USB devices based on those devices' locations, the user can avoid the need for testing the location of and rearranging bootable USB devices every time they are removed and replaced. Rather, according to the system and method disclosed herein, the computer system can identify each bootable USB device by a location-independent identifier, allowing the user to plug bootable USB devices into whichever USB port is currently available. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
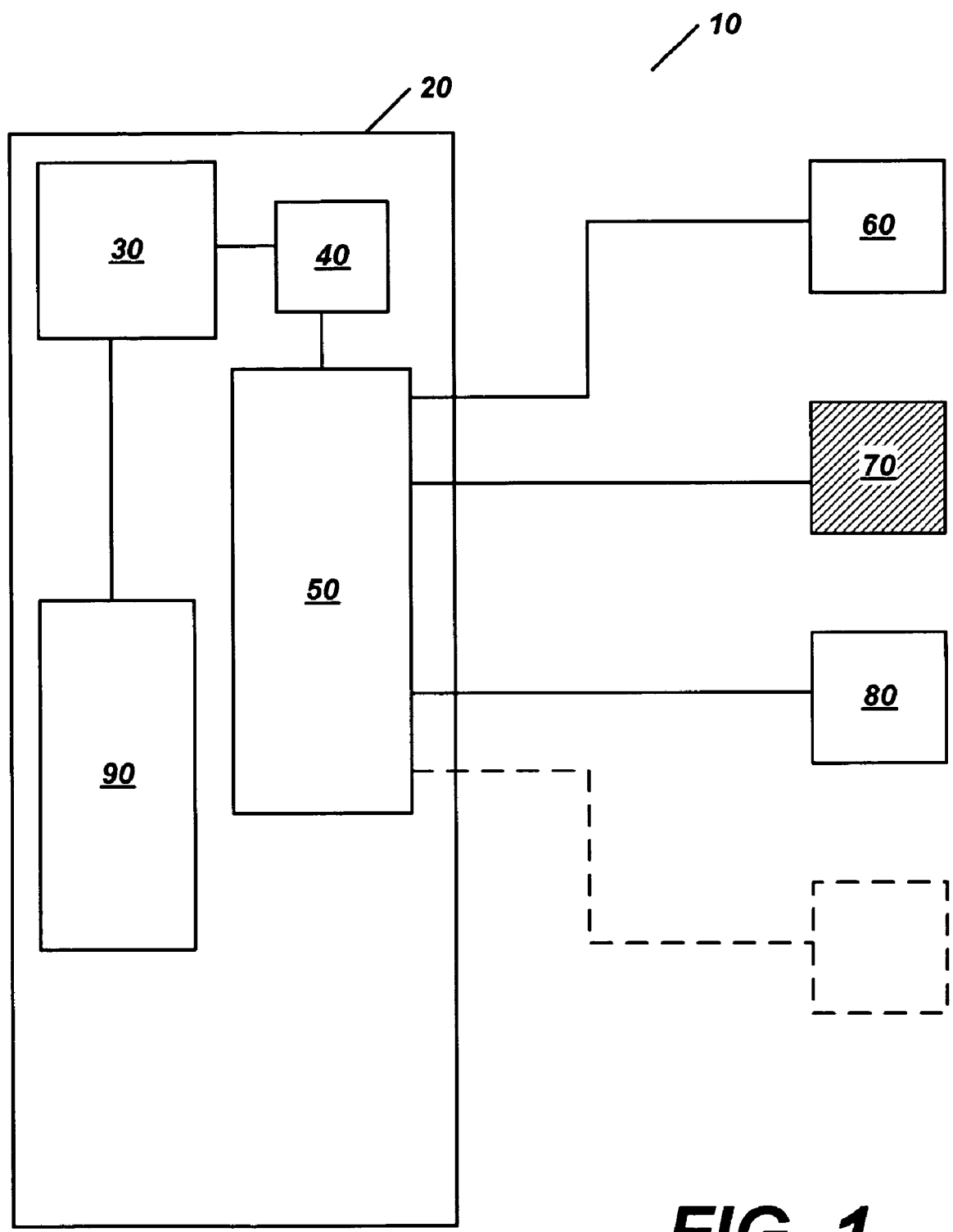
FIG. 1 is a block diagram of hardware and software elements of a computer system.

FIG. 1 illustrates an example computer system, denoted generally with the numeral 10, including a server 20. Server 20 may include a processing unit such as CPU 30. Server 20 may also be equipped with standard BIOS software that allows CPU 30 to execute certain initial functions on startup or reboot. One such command may include searching for a bootable device. Computer system 10 may store the BIOS in a non-volatile storage unit 90 coupled to computer system 10. Computer system 10 is not limited to containing a single server 20; computer system might include any device that requires the user to engage a booting process and that can be coupled to bootable USB devices, including, but not limited to, a device such as a personal computer. As shown in FIG. 1, server 20 also includes a USB host controller 40 that connects to a USB hub 50 with four USB ports, numbered Port 0, Port 1, Port 2 and Port 3. USB hub 50 may have more or fewer USB ports than FIG. 1 depicts. By way of example, computer system 10 also includes three bootable USB devices, numbered 60, 70, and 80. As shown in FIG. 1, Bootable USB device 60 couples to Port 0, bootable USB device 70 couples to Port 1, and bootable USB device 80 couples to Port 2. Port 3 is empty, as indicated by the dashed line. The three bootable USB devices 60, 70 and 80 may be coupled to USB hub 50 in any configuration, however. These three bootable USB devices 60, 70, and 80 also may be any type of bootable USB device, and two or more of the bootable USB devices may be the same type of bootable USB device. For example, bootable USB devices 60, 70, and 80 may all be bootable flash-memory USB devices. Computer system 10 may also include any number of bootable non-USB devices, not shown in FIG. 1. For example, computer system 10 may include bootable BIOS-emulating or BIOS-controlled devices such as CD-ROM drives or floppy drives, PCI devices, or other bootable devices.

When the user boots server 20, the BIOS software stored may direct CPU 30 to look to server 20's non-volatile memory units 90 for a previously stored BIOS boot order table. Non-volatile memory units 90 may be any type of non-volatile storage unit, including, but not limited to, non-volatile flash memory, non-volatile random-access memory ("NVRAM"), and ROM. A previous user or the manufacturer of computer system 10 may have generated the previously stored BIOS boot order table. The BIOS boot order table may contain a list of rankings for all bootable devices, whether they are bootable USB devices, bootable BIOS-emulating or -controlled devices, PCI devices, or some other bootable device. The rankings allow CPU 30 to use the BIOS software stored in server 20 to boot from the various bootable devices in a pre-selected order. For example, the BIOS boot order table might instruct the CPU 30 to boot first from bootable USB device 60. If booting from bootable USB device 60 fails, the BIOS boot order table may then instruct the CPU 30 to boot from bootable USB device 70. If booting from bootable USB device 70 fails, the boot table may then instruct CPU 30 to boot from bootable USB device 80. In sum, CPU 30 will look to the subsequent entries on the boot table to determine which device to use to boot until server 20 successfully boots. Should computer system 10 include bootable non-USB devices as well, those bootable non-USB devices may be included in the boot table as desired.

Figure 2:
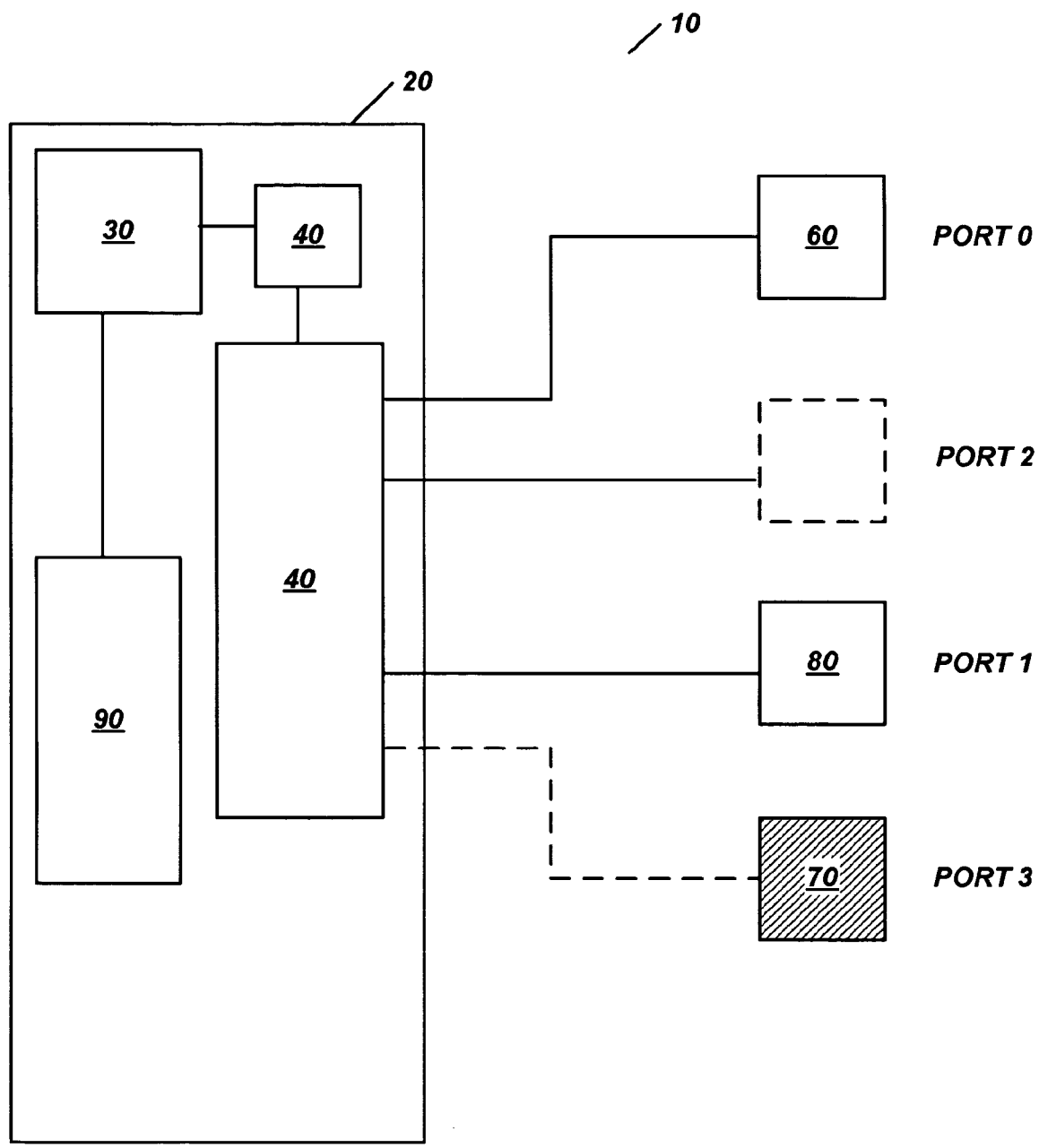
FIG. 2 is another block diagram of hardware and software elements of a computer system.

FIG. 1 illustrates one possible configuration of computer system 10. FIG. 2 illustrates another possible configuration, in which bootable USB device 60 has been moved from Port 1 to Port 3. This may occur, for example, if the user unplugged bootable USB device 60 it from Port 1 and then later plugged it into Port 3—a likely scenario if bootable USB device 60 is a portable memory device such as a flash-memory USB device. CPU 30 may not be able to locate bootable USB device 60 if only the location of a bootable USB device to can be used to identify such the device for the purposes of a BIOS boot order table. That is, if bootable USB device 60 is listed as the first bootable device in the previously stored BIOS boot order table, and if this BIOS boot order table identifies USB device 60 only as the device located in Port 1, CPU 30 will not be able to locate USB device 60 once it has been moved to Port 3. This boot attempt will fail, and CPU 30 will look to the second bootable device listed in the previously stored BIOS boot order table to boot.

This problem could be alleviated if the bootable USB devices themselves could be identified, rather than only identified by their location, which may change from boot to reboot. Each bootable USB device may be associated with a Device Identification Number ("Device ID"), a Vendor Identification Number ("Vendor ID"), and a Serial Number. The standard Device ID and Vendor ID each contain two bytes of data; the standard Serial Number can have any number bytes. The USB specification guarantees that, for a USB device assigned all three of these numbers, a concatenation of the Device ID, Vendor ID, and at least the last twelve bytes of a Serial Number for that device will be unique. This concatenation, however, is too large to fit into the BIOS signature fields of a typical BIOS boot order table, whose size has been predefined as four bytes. While the use could increase the size of the standard BIOS signature fields by a factor of at least four, to sixteen bytes, this increase would require a corresponding increase in non-volatile storage capacity. Moreover, such a change could potentially corrupt existing utilities and applications that rely on the BIOS boot data structures.

With the system and method of the present disclosure, the user can identify multiple bootable USB devices across reboots. A shorter identifier of a given bootable USB device can be generated by performing a hash function of the Device ID, Vendor ID, and the Serial Number, or a subset of the Serial Number that includes the Serial Number's last twelve bytes, for the device, if the device has all three numbers. Although not guaranteed to be unique, the resulting checksum can be treated as a unique signature for the bootable USB device because statistically, the chance that multiple bootable USB devices will have the same checksum is highly unlikely. Moreover, using hash functions employing strong generator polynomials will further decrease the chances that two bootable USB devices will share the resulting checksums. In the improbable event that two bootable USB devices share the same checksum, the BIOS can inform the user of the error, and the user can either swap the locations of the devices or use different devices.

Many suitable hash functions are well-known in the art. For example, CPU 30 may perform a cyclic redundancy check ("CRC") function such as a 32-bit CRC ("CRC32") function to generate a checksum from the Device ID, Vendor ID, and the Serial Number associated with bootable USB device 60. If the Serial Number has more than twelve digits, the system and method may use some specific set of digits from the Serial Number that includes at least the last twelve digits of the Serial Number, so long as the same set of digits is used for each bootable USB device. Thus CPU 30 can generate location-independent identifiers for each bootable USB device 60, 70, and 80 and locate these devices across multiple reboots of computer system 10 using these identifiers, even if one or more of the bootable USB devices changes locations between reboots. In computer systems other than computer system 10, hash functions other than CRC32 functions may be appropriate, as a person of ordinary skill in the art having the benefit of this disclosure will realize.

Figure 3:
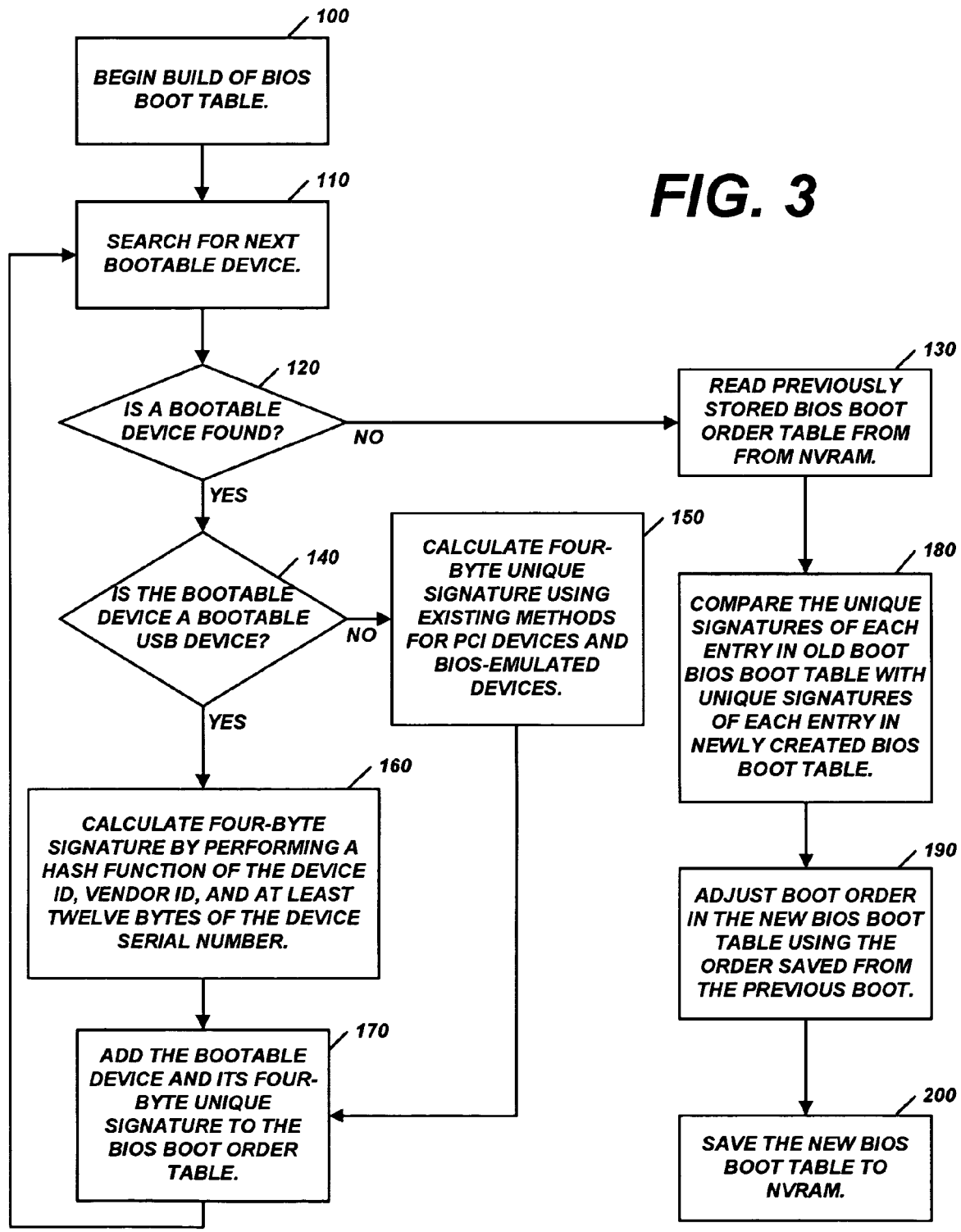
FIG. 3 is a flow diagram of a method for generating a BIOS boot order table including a four-byte signature for each bootable USB device coupled to a computer system.

FIG. 3 shows a flow chart setting out how computer system 10 may use the identifier to generate a new BIOS boot order table. In the step shown in block 100, CPU 30 begins building the BIOS boot order table based on the bootable devices found during Power-On-Self-Test ("POST"). In block 110, CPU 30 searches for the next bootable device in computer system 10. At this time in the process, the "next" bootable device will be the first bootable device available to CPU 30. At block 120, if no more bootable devices are available in computer system 10, CPU 30 will proceed to the step described in block 130, which will be discussed in more detail later in this disclosure.

If a bootable device is found during the step shown in block 120, CPU 30 then proceeds to block 140. At the step described in block 140, CPU 30 must determine whether the next bootable device is a USB device. If the next bootable device is a bootable non-USB device, such as a BIOS-emulating or -controlled device, or a PCI device, CPU 30 will then proceed to the step in block 150 and calculate a four-byte signature using existing methods for identifying PCI devices and BIOS-emulating or -controlled devices. If the new bootable device is a bootable USB device, CPU 30 may proceed to the step shown in block 160 and calculate a four-byte signature by performing a hash function of the bootable USB device's Device ID, Vendor ID, and at least the last twelve bytes of the device's Serial Number. CPU 30 may then add this bootable device and its four-byte signature to the new BIOS boot order table, as shown in block 170. Likewise, if the new bootable device is a PCI device or BIOS-emulating or -controlled device, the four-byte signature calculated using existing methods can be added to the BIOS boot order table.

At this point, CPU 30 returns to the step in block 110 and searches for the next bootable device. If CPU 30 detects a new bootable device, it repeats the steps shown in blocks 140-170, as applicable. CPU 30 repeats this process until it detects no new devices. At this point, CPU 30 will proceed to the step shown in block 130, and read the previously stored BIOS boot order table from non-volatile storage units 90. This BIOS boot order table would likely have been generated previously to boot computer system 10 according to the user or manufacturer's preferences. CPU 30 will compare the four-byte signatures for each entry in the BIOS boot order table with the four-byte signatures of each entry in the newly created BIOS boot order table, as shown in block 180. CPU 30 will then adjust the boot order in the new BIOS boot order table to reflect the order shown in the old BIOS boot order table, as described in block 190. The user or manufacturer of server 20 can determine what rank any newly discovered bootable devices will have in the BIOS boot order table. For example, the BIOS can poll the user at the step shown in block 190; the user can then determine where in the boot order table the new bootable device should be located. Alternatively, the user or manufacturer of server 20 can select a default location for any new bootable devices, such as at the bottom of the boot order table. Once the new boot order table is complete, CPU 30 can save the new boot order table to the non-volatile storage units 90, for future use, as shown in block 200. This method can be repeated on each reboot of computer system 10.

In the example of the present disclosure, server 20 and bootable USB devices 60, 70 and 80 are shown as the only elements of computer system 10. It should be recognized, however, that alternative and additional elements may exist within computer system 10. As an example, computer system 10 may include multiple servers 10, or one or more personal computers. Computer system 10 may also include non-bootable devices, which may or may not be USB devices. For example, computer system 10 may include one or more input devices such as a keyboard or mouse. It should be recognized that system and method disclosed herein is not limited in its application to the system architecture disclosed herein. It should also be recognized that the system and method described herein is not limited in its application to single processor computer systems. Rather, the system and method disclosed herein may likewise be applied in multiprocessor computer systems. Although the present disclosure has been described in detail, it should be understood that various changes, substitutions, and alterations can be made hereto without departing from the spirit and the scope of the invention as defined by the appended claims.

What is claimed is:

1. A method for identifying at least one bootable device of a computer system, comprising:
   generating a signature for each bootable device by performing a logical function on a device identifier, a vendor identifier, and at least a subset of a serial number, all of which are associated with the bootable device, wherein the signature is independent of a location of the bootable device; and
   saving the signature for each bootable device in non-volatile storage in the computer system.

2. The method for identifying at least one bootable device of a computer system of claim 1, wherein the step of generating a signature for each bootable device by performing a logical function comprises the step of performing a cyclic redundancy check function on the device identifier, vendor identifier, and serial number associated with the bootable device.

3. The method for identifying at least one bootable device of a computer system of claim 1, wherein the step of generating a signature for each bootable device by performing a logical function comprises the step of performing a 32-bit cyclic redundancy check function on the device identifier, vendor identifier, and serial number associated with the bootable device.

4. The method for identifying at least one bootable device of a computer system of claim 1, wherein the step of generating a signature for each bootable device by performing a logical function comprises the step of performing a logical function on the device identifier, vendor identifier, and a subset of the serial number that contains at least the last twelve digits of the serial number associated with the bootable device.

5. The method for identifying at least one bootable device of a computer system of claim 1, wherein the step of saving the signature for each bootable device in non-volatile storage comprises saving the signature for each bootable device in a Basic Input-Output System ("BIOS") boot order table located in non-volatile random access memory unit in the computer system.

6. The method for identifying at least one bootable device of a computer system of claim 1, wherein the step of saving the signature for each bootable device in non-volatile storage comprises saving the signature for each bootable device in a Basic Input-Output System ("BIOS") boot order table located in a non-volatile flash memory unit in the computer system.

7. A system for identifying at least one bootable Universal Serial Bus ("USB") device coupled to a computer system across multiple reboots of the computer system, wherein the at least one bootable USB device is associated with a Device Identification Number, a Vendor Identification Number, and a Serial Number, comprising:
 a processing unit coupled to the computer system, wherein the processing unit is capable of generating a four-byte signature for each bootable USB device by performing a hash function on the Device Identification Number, the Vendor Identification Number, and the Serial Number, and wherein the four-byte signature is independent of a location of the bootable USB device;
 a non-volatile storage unit coupled to computer system, wherein the non-volatile storage unit contains a copy of a Basic Input-Output System ("BIOS"); and
 a non-volatile storage unit coupled to the computer system in which the processing unit can store a BIOS boot order table containing the four-byte signature for each bootable USB device coupled to the computer system.

8. The system for identifying at least one bootable USB device coupled to a computer system of claim 7, wherein the non-volatile storage units are one or more non-volatile random-access memory units.

9. The system for identifying at least one bootable USB device coupled to a computer system of claim 7, wherein the copy of the BIOS and the BIOS boot order table containing the four-byte signature for each bootable USB device are stored in the same non-volatile storage unit.

10. The system for identifying at least one bootable USB device coupled to a computer system of claim 7, further comprising at least one bootable non-USB device coupled to the computer system.

11. A method for identifying at least one bootable Universal Serial Bus ("USB") device coupled to a computer system across multiple reboots of the computer system, comprising building a current Basic Input-Output System ("BIOS") boot order table containing a four-byte signature for each bootable USB device upon first detection of the at least one bootable USB device after a reboot of the computer system, wherein:
 the four-byte signature for each bootable USB device is generated by performing a hash function on a Device Identification Number, a Vendor Identification Number, and at least a subset of a Serial Number, all of which are associated with the bootable USB device; and the four-byte signature is independent of a location of the bootable USB device.

12. The method for identifying at least one bootable USB device coupled to a computer system across multiple reboots of the computer system of claim 11, wherein building a current BIOS boot order table containing a four-byte signature for each bootable USB device upon first detection of the at least one bootable USB device after reboot of the computer system comprises:
 searching for a bootable device,
 determining whether, if a bootable device is found, the bootable device is a bootable USB device,
 calculating a four-byte signature for the bootable device, wherein, if the bootable device is a bootable USB device, calculating the four-byte signature for the bootable device is accomplished by performing a hash function on the Device Identification Number, the Vendor Identification Number, and at least a subset of the Serial Number,
 adding the four-byte signature for the bootable device to a BIOS boot order table, thereby generating a current BIOS boot order table, and
 saving the current BIOS boot order table in a non-volatile storage unit.

13. The method for identifying at least one bootable USB device coupled to a computer system across multiple reboots of the computer system of claim 12, further comprising:
 reading a BIOS boot order table previously stored in the computer system,
 comparing the four-byte signature for each entry in the previously stored BIOS boot order table with the four-byte signature for each entry in the current BIOS boot order table,
 adjusting the boot order in the current BIOS boot order table using the order saved from the previously stored BIOS boot order table.

14. The method for identifying at least one bootable USB device coupled to a computer system across multiple reboots of the computer system of claim 12, further comprising providing a user of the computer system an option to determine where to add the at least one bootable device to the current BIOS boot order table.

15. The method for identifying at least one bootable USB device coupled to a computer system across multiple reboots of the computer system of claim 12, further comprising adding the at least one bootable device to a default location in the current BIOS boot order table.

16. The method for identifying at least one bootable USB device coupled to a computer system across multiple reboots of the computer system of claim 15, wherein adding the at least one bootable device to a default location in the current BIOS boot order table comprises adding the at least one bootable device to a terminal location in the current BIOS boot order table.

17. The method for identifying at least one bootable USB device coupled to a computer system across multiple reboots of the computer system of claim 11, wherein calculating the four-byte signature for each bootable USB device is accomplished by performing a cyclic redundancy check function on the Device Identification Number, the Vendor Identification Number, and at least a subset of the Serial Number.

18. The method for identifying at least one bootable USB device coupled to a computer system across multiple reboots of the computer system of claim 11, wherein calculating the four-byte signature for each bootable USB device is accomplished by performing a 32-bit cyclic redundancy check function on the Device Identification Number, the Vendor Identification Number, and at least a subset of the Serial Number.

19. The method for identifying at least one bootable USB device coupled to a computer system across multiple reboots of the computer system of claim 11, wherein calculating the four-byte signature for each bootable USB device is accomplished by performing a hash function on the Device Identification Number, the Vendor Identification Number, and a subset of the Serial Number that includes at least the final twelve digits of the Serial Number.

20. The method for identifying at least one bootable USB device coupled to a computer system across multiple reboots of the computer system of claim 11, wherein calculating the four-byte signature for each bootable USB device is accomplished by performing a 32-bit cyclic redundancy check function on the Device Identification Number, the Vendor Identification Number, and a subset of the Serial Number that includes at least the final twelve digits of the Serial Number.

* * * * *

UNITED STATES PATENT AND TRADEMARK OFFICE
CERTIFICATE OF CORRECTION

PATENT NO. : 7,584,347 B2 Page 1 of 1
APPLICATION NO. : 11/150750
DATED : September 1, 2009
INVENTOR(S) : El-Haj-mahmoud et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 682 days.

Signed and Sealed this

Fourteenth Day of September, 2010

David J. Kappos
*Director of the United States Patent and Trademark Office*